United States Patent
Watanabe et al.

(10) Patent No.: US 7,137,113 B2
(45) Date of Patent: Nov. 14, 2006

(54) PROGRAM OPERATING APPARATUS AND PROGRAM WRITE CONTROL APPARATUS AND METHOD

(75) Inventors: Naoto Watanabe, Chiba (JP); Masatoshi Yaginuma, Ibaraki (JP); Kiyoshi Okamoto, Ibaraki (JP); Hitoshi Kato, Ibaraki (JP)

(73) Assignee: Canon Kabushiki Kaisha (JP)

( * ) Notice: Subject to any disclaimer, the term of this patent is extended or adjusted under 35 U.S.C. 154(b) by 667 days.

(21) Appl. No.: 10/092,006

(22) Filed: Mar. 6, 2002

(65) Prior Publication Data
US 2002/0170051 A1  Nov. 14, 2002

(30) Foreign Application Priority Data
Mar. 7, 2001  (JP) .............................. 2001-063031

(51) Int. Cl.
G06F 9/44   (2006.01)
G06F 9/445  (2006.01)

(52) U.S. Cl. ...................... 717/168; 717/170; 717/174

(58) Field of Classification Search ........ 717/168–172, 717/174–176; 710/32, 65; 345/629; 355/40
See application file for complete search history.

(56) References Cited

U.S. PATENT DOCUMENTS

| | | | | |
|---|---|---|---|---|
| 5,461,705 A * | 10/1995 | Wakabayashi et al. | ..... | 358/1.16 |
| 5,844,843 A * | 12/1998 | Matsubara et al. | .... | 365/185.24 |
| 5,881,327 A * | 3/1999 | Yoshida | ...................... | 396/207 |
| 6,094,698 A * | 7/2000 | Namikawa | .................... | 710/74 |
| 6,282,583 B1 * | 8/2001 | Pincus et al. | ................ | 713/375 |
| 6,618,117 B1 * | 9/2003 | Silverbrook | .................. | 355/18 |
| 6,662,314 B1 * | 12/2003 | Iwata et al. | .................... | 714/42 |
| 6,681,336 B1 * | 1/2004 | Nakazato et al. | ........... | 713/322 |
| 6,697,167 B1 * | 2/2004 | Takahashi | .................... | 358/1.9 |
| 6,704,933 B1 * | 3/2004 | Tanaka et al. | .............. | 725/132 |
| 6,728,164 B1 * | 4/2004 | Mori | ........................ | 365/238.5 |
| 6,745,278 B1 * | 6/2004 | Oba | ........................... | 711/103 |
| 6,754,895 B1 * | 6/2004 | Bartel et al. | ................. | 717/171 |
| 6,857,119 B1 * | 2/2005 | Desai | ......................... | 717/145 |
| 6,931,637 B1 * | 8/2005 | Lee et al. | .................... | 717/168 |
| 6,954,254 B1 * | 10/2005 | Silverbrook | .................. | 355/18 |
| 7,050,337 B1 * | 5/2006 | Iwase et al. | ........... | 365/189.05 |
| 7,051,325 B1 * | 5/2006 | Choi et al. | ................... | 717/168 |
| 7,062,765 B1 * | 6/2006 | Pitzel et al. | ................. | 717/177 |

FOREIGN PATENT DOCUMENTS

JP  4-205503  7/1992

(Continued)

OTHER PUBLICATIONS

Manassiev et al, "Explotiing distributed version concurrency in a transactional memory cluster", ACM PPoPP pp. 198-208, 2006.*

(Continued)

*Primary Examiner*—Anil Khatri
(74) *Attorney, Agent, or Firm*—Rossi, Kimms & McDowell, LLP

(57) ABSTRACT

A program operating apparatus is provided, which is capable of rewriting control programs for a plurality of CPUs without using any exclusive external apparatuses, thereby achieving a simplified and efficient rewrite operation. A control program stored in a ROM of a master CPU that controls the basic operation of the entire apparatus is transferred to a slave CPU and then written to an internal ROM of the slave CPU which controls the operations of functional units of the apparatus. The transfer of the control program is carried out when the mode of the apparatus is switched to a write control mode.

28 Claims, 7 Drawing Sheets

FOREIGN PATENT DOCUMENTS

| | | |
|---|---|---|
| JP | 5-80602 | 4/1993 |
| JP | 5-80608 | 4/1993 |
| JP | 5-80610 | 4/1993 |
| JP | 5-216637 | 8/1993 |
| JP | 9-6194 | 1/1997 |
| JP | 11-123858 | 5/1999 |

OTHER PUBLICATIONS

Borgatti et al, "A reconfigurable signal processing IC with embaded FPGA and lulti port flash memeory", ACM DAC, pp. 691-695, 2003.*

Bernardi et al, A P1500 compatibale programmbale BIST approach for the test of embabde flash memories, IEEE Date, , pp. 1-6, 2003.*

Sherwood et al, "Patchable instruction ROM architecture", ACM CASE, pp. 24-33, 2001.*

* cited by examiner

PROGRAM OPERATING APPARATUS AND PROGRAM WRITE CONTROL APPARATUS AND METHOD

BACKGROUND OF THE INVENTION

1. Field of the Invention

The present invention relates to a program operating apparatus and a program write control apparatus and method, and in particular, to a program operating apparatus and a program write control apparatus and method which suitably controls writing to rewritable storage means storing a control program for operating a finisher provided in an image forming apparatus.

2. Description of the Related Art

Storage media such as ROMs have been used as storage means to store control codes for controlling equipment, but in recent years, more and more rewritable storage media such as flash ROMs have come to be used for the same purpose. Further, some types of equipment are provided with a rewritable storage medium such as a flash ROM inside a CPU. To rewrite a control program in such equipment, an external apparatus such as a host computer which is connected to the equipment via a communication medium transfers data to the rewritable storage medium in the equipment to rewrite the control program.

However, the above described conventional technique has the following problems: That is, with the conventional technique, to rewrite the control program in the flash ROM or the like in the equipment, the external apparatus such as the host computer transfers data to the equipment. Thus, after an operator has downloaded the control program in the external apparatus, he cannot start a rewrite operation before he brings the external apparatus to an operation site to connect the external apparatus and the equipment together. As a result, the operator has to disadvantageously spend much time to prepare for the rewrite operation. It is also disadvantageous that the external apparatus exclusively used for the rewrite operation has to be provided.

SUMMARY OF THE INVENTION

The present invention is provided in view of the above described disadvantages, and it is an object of the present invention to provide a program operating apparatus and a program write control apparatus and method which are capable of rewriting control programs for a plurality of CPUs without using any exclusive external apparatuses, thereby achieving a simplified and efficient rewrite operation.

To attain the above object, a first aspect of the present invention provides a program operating apparatus comprising a first CPU that has operation thereof controlled by a first control program, a second CPU that has operation thereof controlled by a second control program, first storage means capable of storing the first control program, the second control program, and a write control program, second storage means capable of storing the second control program, and write control means operable when a mode of the apparatus is switched to a write control mode in which the second control program is written to the second storage means, for executing write control comprising transferring the write control program to the second CPU, and causing the second CPU to write the second control program stored in the first storage means to the second storage means.

In a preferred embodiment, the write control means is operable when the mode of the apparatus is switched to the write control mode, for transferring the write control program for executing a process of writing the second control program to the second storage means to a storage area accessible by the second CPU, and causing the second CPU to execute the write control program to thereby write the second control program stored in the first storage means to the second storage means.

Preferably, the first storage means is removable from the program operating apparatus.

Also preferably, the second storage means comprises a rewritable non-volatile storage medium.

More preferably, the second storage means comprises a rewritable non-volatile storage medium provided in the second CPU.

Preferably, the program operating apparatus comprises switching means for switching between a normal control mode in which normal control of the apparatus is carried out and the write control mode.

In a typical preferred embodiment, the program operating apparatus is applicable to an image forming apparatus for forming images on sheets.

In this case, the image forming apparatus comprises a main body, and at least one functional unit, and the first CPU controls basic operation of the main body of the image forming apparatus, and the second CPU controls operations of the at least one functional unit.

Alternatively, the program operating apparatus is applicable to a finisher for executing post-processing on sheets having images formed thereon.

In this case, the finisher comprises a main body, and at least one functional unit, and wherein the first CPU controls basic operation of the main body of the finisher, and the second CPU controls operations of the at least one functional unit.

To attain the above object, a second aspect of the present invention provides a program write control apparatus installed on a program operating apparatus comprising a first CPU that has operation thereof controlled by a first control program, a second CPU that has operation thereof controlled by a second control program, first storage means capable of storing the first control program, the second control program, and a write control program, and second storage means capable of storing the second control program, the program write control apparatus comprising write control means operable when a mode of the apparatus is switched to a write control mode in which the second control program is written to the second storage means, for executing write control comprising transferring the write control program to the second CPU, and causing the second CPU to write the second control program stored in the first storage means to the second storage means.

To attain the above object, a third aspect of the present invention provides a program write control method executed by a program operating apparatus comprising a first CPU that has operation thereof controlled by a first control program, a second CPU that has operation thereof controlled by a second control program, first storage means capable of storing the first control program, the second control program, and a write control program, and second storage means capable of storing the second control program, the method comprising the step of executing write control comprising transferring the write control program to the second CPU, and causing the second CPU to write the second control program stored in the first storage means to the second storage means when a mode of the apparatus is switched to a write control mode in which the second control program is written to the second storage means.

To attain the above object, a fourth aspect of the present invention provides a program operating apparatus comprising at least one functional unit, a first CPU that controls basic operation of the apparatus according to a first control program, a second CPU that controls operation of the functional unit according to a second control program, first storage means capable of storing the first control program and the second control program, second storage means capable of storing the second control program, and write control means operable when a mode of the apparatus is switched to a write control mode in which the second control program is written to the second storage means, for controlling writing the second control program stored in the first storage means to the second storage means.

To attain the above object, a fifth aspect of the present invention provides a image forming apparatus comprising at least one functional unit, a first CPU that controls basic operation of the apparatus according to a first control program, a second CPU that controls operation of the functional unit according to a second control program, first storage means capable of storing the first control program, the second control program, and a write control program, second storage means capable of storing the second control program, and write control means operable when a mode of the apparatus is switched to a write control mode in which the second control program is written to the second storage means, for executing write control comprising transferring the write control program to the second CPU, and causing the second CPU to write the second control program stored in the first storage means to the second storage means.

To attain the above object, a sixth aspect of the present invention provides a finisher comprising at least one functional unit, a first CPU that controls basic operation of the finisher according to a first control program, a second CPU that controls operation of the functional unit according to a second control program, first storage means capable of storing the first control program, the second control program, and a write control program, second storage means capable of storing the second control program, and write control means operable when a mode of the finisher is switched to a write control mode in which the second control program is written to the second storage means, for executing write control comprising transferring the write control program to the second CPU, and causing the second CPU to write the second control program stored in the first storage means to the second storage means.

The above and other objects, features, and advantages of the present invention will be more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
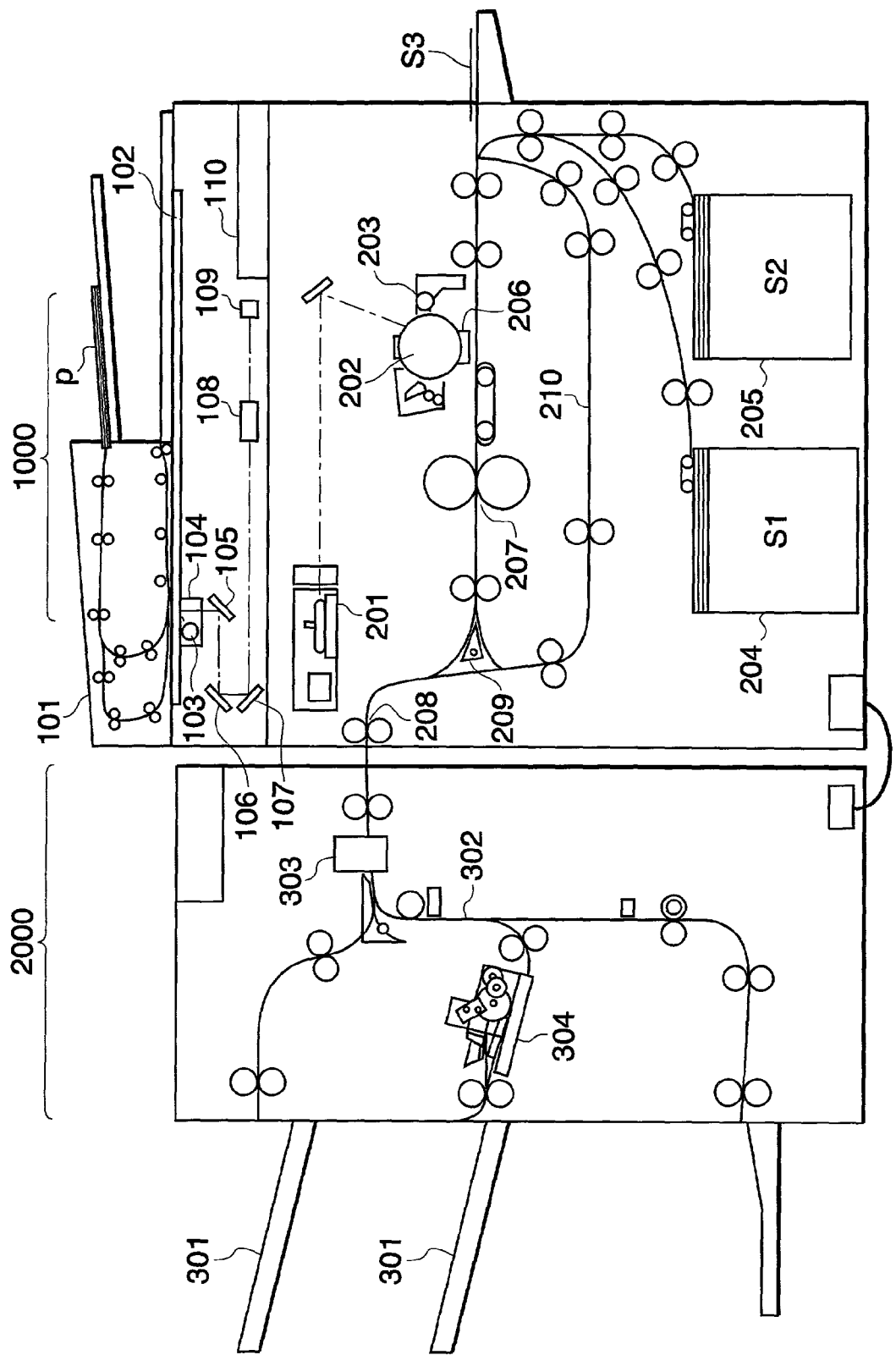
FIG. 1 is a schematic view showing the internal structure of an example of an image forming system to which the present invention is applied.

FIG. 1 is a schematic view showing the internal structure of an example of an image forming system to which the present invention is applied. The image forming system is comprised of an image forming apparatus 1000 composed of a reader section having an image reading function and a printer section having a printing function, and a finisher 2000 that executes post-processing (a sorting process, a stapling process, and others) on sheets on which printing has been completed by the image forming apparatus.

First, a description will be given of the flow of processing executed by the image forming process, from reading of an original image to post-processing on sheets on which printing has been completed, following printing of the read image. In the reader section, originals stacked on an original feeding device 101 are conveyed onto an original table glass 102 sheet by sheet. When each original sheet is conveyed to a predetermined position on the original glass 102, a lamp 103 in a scanner unit 104 is lighted, and the scanner unit 104 is moved in a horizontal direction as viewed in the figure to illuminate the original.

Reflected light from the original is input to a CCD image sensor section (hereinafter simply referred to as the "CCD") 109 via mirrors 105, 106, and 107 and a lens 108. The reflected light from the original which has been incident on the CCD 109 is photoelectrically converted by the CCD 109. An electric signal obtained by the photoelectric conversion is transmitted to an image processing section 110.

An external switching circuit, not shown, of the image processing section 110 transmits the electric signal from the reader section to the printer section. Then, an exposure control section 201 converts the signal into a modulated optical signal, which is then applied to a photosensitive member 202. As the photosensitive member 202 is irradiated with light, a latent image formed on a surface of the photosensitive member 202 is developed by a developing device 203. In timing synchronous with the start of this developing step, a transfer sheet stack section 204 (S1) or 205 (S2) conveys a transfer sheet to a transfer section 206, which then transfers the developed image to the transfer sheet.

The image transferred to the transfer sheet is fixed to the transfer sheet, which is then discharged from the image forming apparatus 1000 by a sheet discharging section 208. Transfer sheets thus discharged from the image forming apparatus 1000 by the sheet discharging section 208 are then conveyed to the finisher 2000 via a conveyance path, not shown. The finisher 2000 executes post-processing such as a sorting process and a stapling process on the transfer sheets and then loads the processed transfer sheets onto a bin unit 301.

Now, a description will be given of a method of printing images sequentially read from originals to both sides of one output sheet and outputting the output sheet. A transfer sheet with an image fixed to one side surface thereof in accordance with the above described processing is conveyed to the sheet discharging section 208, and then the direction in which the transfer sheet is conveyed is reversed to convey it to a sheet-refeeding transferred-sheet loading section 210 via a transfer direction switching member 209. Once originals are prepared, original images are read in accordance with the above described processing. However, since the sheet-refeeding transferred-sheet loading section 210 feeds the transfer sheet with the image already fixed to one side surface thereof in an upset down state, images from two originals can be printed on the front and back side surfaces, respectively, of the same transfer sheet for outputting.

Next, the finisher 2000 will be described. The finisher 2000 is comprised of bin units 301 that accommodate respective bundles of transfer sheets thereon which are discharged from the image forming apparatus 1000, a sheet conveying unit 302 that conveys transfer sheets, a punch unit 303 that punches transfer sheets being conveyed through the sheet conveying unit 302, and a staple unit 304 that staples a bundle of transfer sheets loaded on the bin unit 301.

Figure 2:
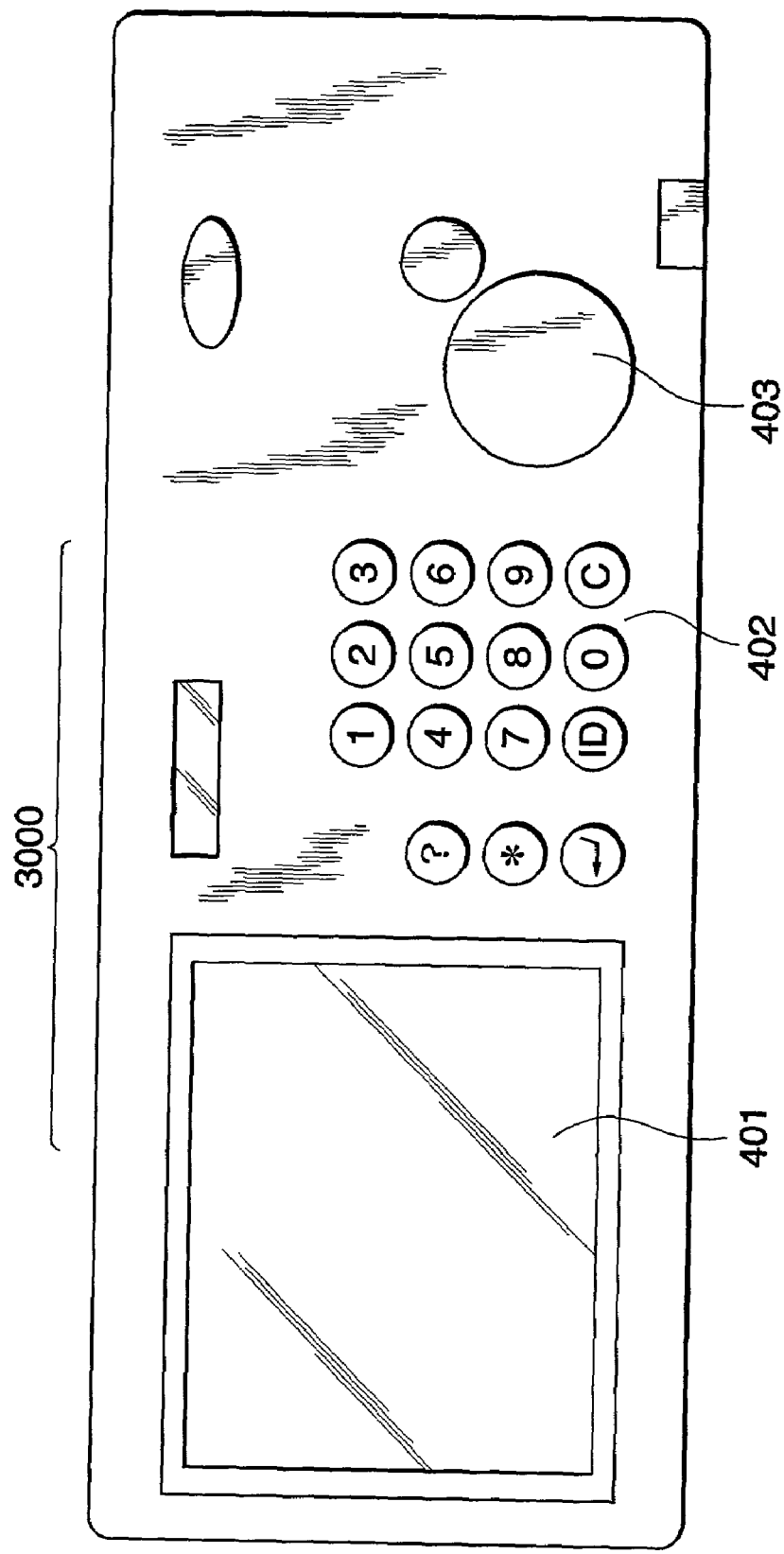
FIG. 2 is a front view showing the construction of an operating section of the image forming system in FIG. 1.

FIG. 2 is a front view showing the construction of an operating section 3000 provided in the image forming apparatus 1000 of the image forming system in FIG. 1. The operating section 3000 is comprised of a display section 401, ten keys 402, and a start key 403.

The display section 401 displays the operative state of the image forming system, various messages, and the like. The display section 401 has a display surface composed of a touch panel, which operates as selection keys when touched by an operator. The ten keys 402 are depressed to input numerical values. The start key 403 is depressed to direct a copy operation to be started.

Figure 3:
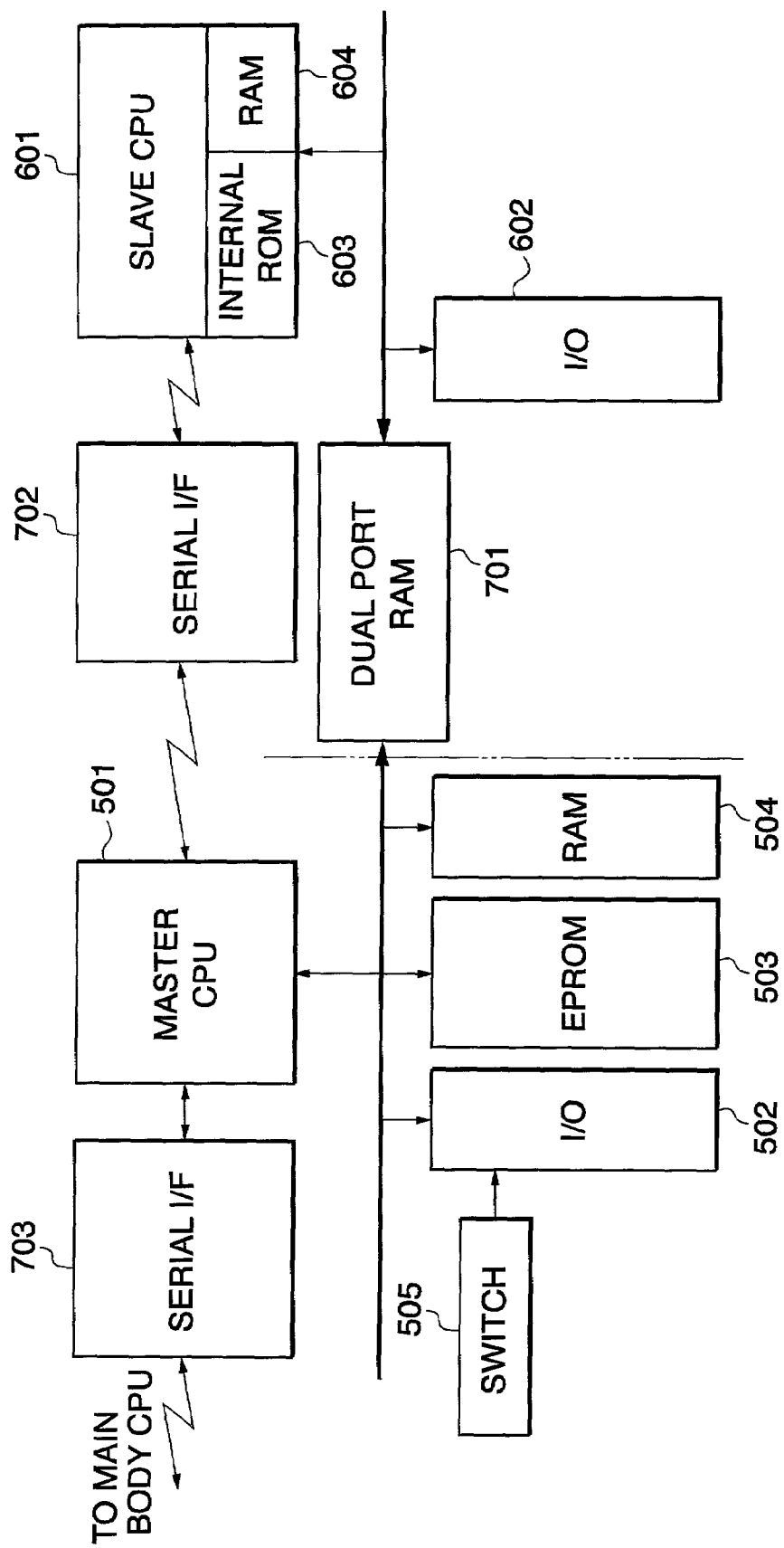
FIG. 3 is a block diagram showing the construction of a control system of a finisher of the image forming system.

FIG. 3 is a block diagram showing the construction of a control system of the finisher 2000. The control system of the finisher 2000 is comprised of a master CPU 501, an input/output (I/O) port 502, an EPROM 503, a work RAM 504, a switch 505, a slave CPU 601, an input/output (I/O) port 602, a dual port RAM 701, a serial interface (I/F) 702, and a serial interface (I/F) 703. The EPROM 503 is removable via an IC socket, not shown.

The master CPU 501 controls the basic operation of the entire finisher 2000, and is connected to the I/O port 502 via an address bus and a data bus. The master CPU 501 operates on a control program to execute a control process shown in FIGS. 6 and 7, described later, except steps executed by the slave CPU 601. The EPROM 503 (first storage means) is a memory that stores the control program for the master CPU 501 and control programs described later. The work RAM 504 is used by the master CPU 501 to execute predetermined processing.

The slave CPU 601 is provided separately from the master CPU 501 and controls the operations of the staple unit 304 and punch unit 303 (functional units of the finisher), and is connected to the I/O port 602 via the address bus and data bus. The slave CPU 601 operates on a control program to execute the steps shown in FIGS. 6 and 7, described later, other than those executed by the master CPU 501. The slave CPU 601 is provided with an internal flash ROM 603 (second storage means) in which the control program is stored, and a work RAM 604 used for a write control process.

As described above, the EPROM 503 stores the control program (first control program) for the master CPU 501, as well as the control program (second control program) for the slave CPU 601 and a write control program. In this case, an EEPROM may be used in place of the EPROM.

The write control program is executed by the slave CPU 601 to cause the slave CPU 601 and the master CPU 501 to communicate with each other to execute a write process of writing the second control program stored in the EPROM 503 to the internal ROM 603.

Possible errors in writing to the internal flash ROM of the slave CPU can be prevented by thus storing the write control program in the EPROM 503 of the master CPU 501 and transferring it to the slave CPU 601 for executing the write control process. This is because the write control program can be prepared for exclusive use in writing the transferred control program.

However, the write control program may be stored beforehand in a storage area which can be accessed by the slave CPU 601 to execute the program rather than being stored in the EPROM 503 of the master CPU 501.

The I/O port 502 which is under the control of the master CPU 501 is provided with the switch 505 (switching means) as an input port, which switches between a write control mode (in which writing to the internal flash ROM 603 of the slave CPU 601 is executed) and a normal control mode (in which the apparatus performs normal operations). The switch 505 can be set on or off. When the switch 505 is set on, the image forming system is brought into the write control mode. On the other hand, when the switch 505 is set off, the image forming system is brought into the normal control mode.

The dual port RAM 701 is provided to transmit data between the master CPU 501 and the slave CPU 601. The serial I/F 702 allows the master CPU 501 and the slave CPU 601 to transmit and receive data to and from each other in the write control mode. The serial I/F 703 allows the master CPU 501 of the finisher 2000 and a CPU controlling the image forming apparatus 1000 to communicate with each other.

Figure 4:
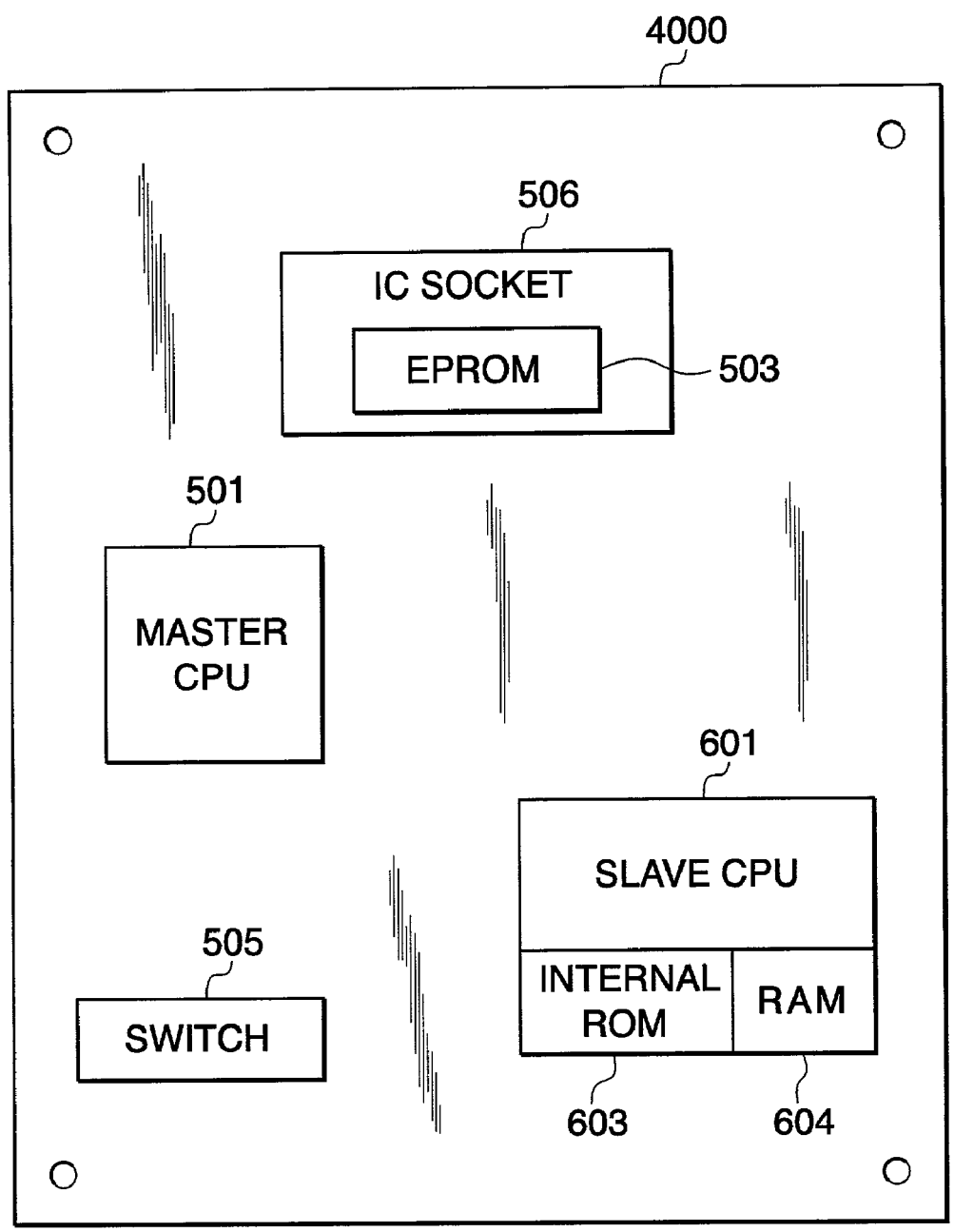
FIG. 4 is a schematic view of a controller circuit board of the finisher of the image forming system.

FIG. 4 is a schematic view of a controller circuit board 4000 of the finisher 2000. The master CPU 501, I/O port 502, EPROM 503, work RAM 504, switch 505, slave CPU 601, I/O port 602, dual port RAM 701, serial I/F 702, and serial I/F 703 are arranged on the same circuit board. The EPROM 503 is removable, and is inserted into an IC socket 506. Rather than being arranged on the same circuit board, the switch 505 may be installed at a different location where the operator can easily operate it.

Figure 5:
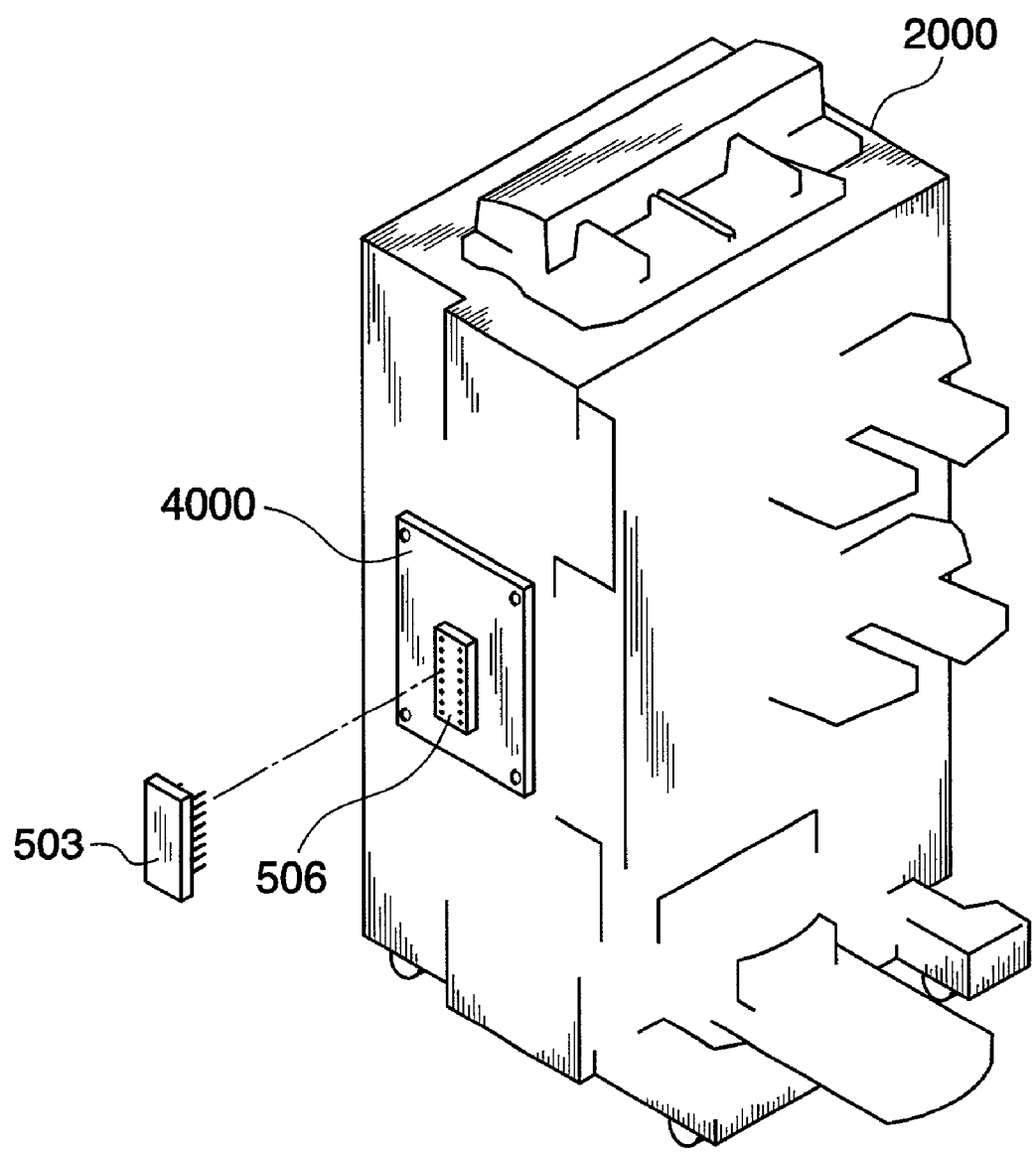
FIG. 5 is a perspective view of the finisher of the image forming system.

FIG. 5 is a perspective view of the finisher 2000 in FIG. 1 as viewed from its rear side. The controller circuit board 4000 is installed at a location where the operator can easily insert the EPROM 503 into the IC socket 506. That is, the finisher 2000 is provided with the IC socket 506 on a rear surface thereof at a location where the socket 506 can be externally seen.

Now, with reference to FIGS. 6 and 7, a detailed description will be given of a process of writing the second control program to the internal flash ROM 603 provided in the slave CPU 601 of the finisher 2000 of the image forming system constructed as above. Before executing a process of controlling writing of the control program, the operator mounts the EPROM 503 storing the desired control program, in the IC socket 506. Further, the operator turns on the switch 505 installed in the finisher 2000, and then instructs the image forming system to execute the process of controlling writing of the control program.

Figure 6:
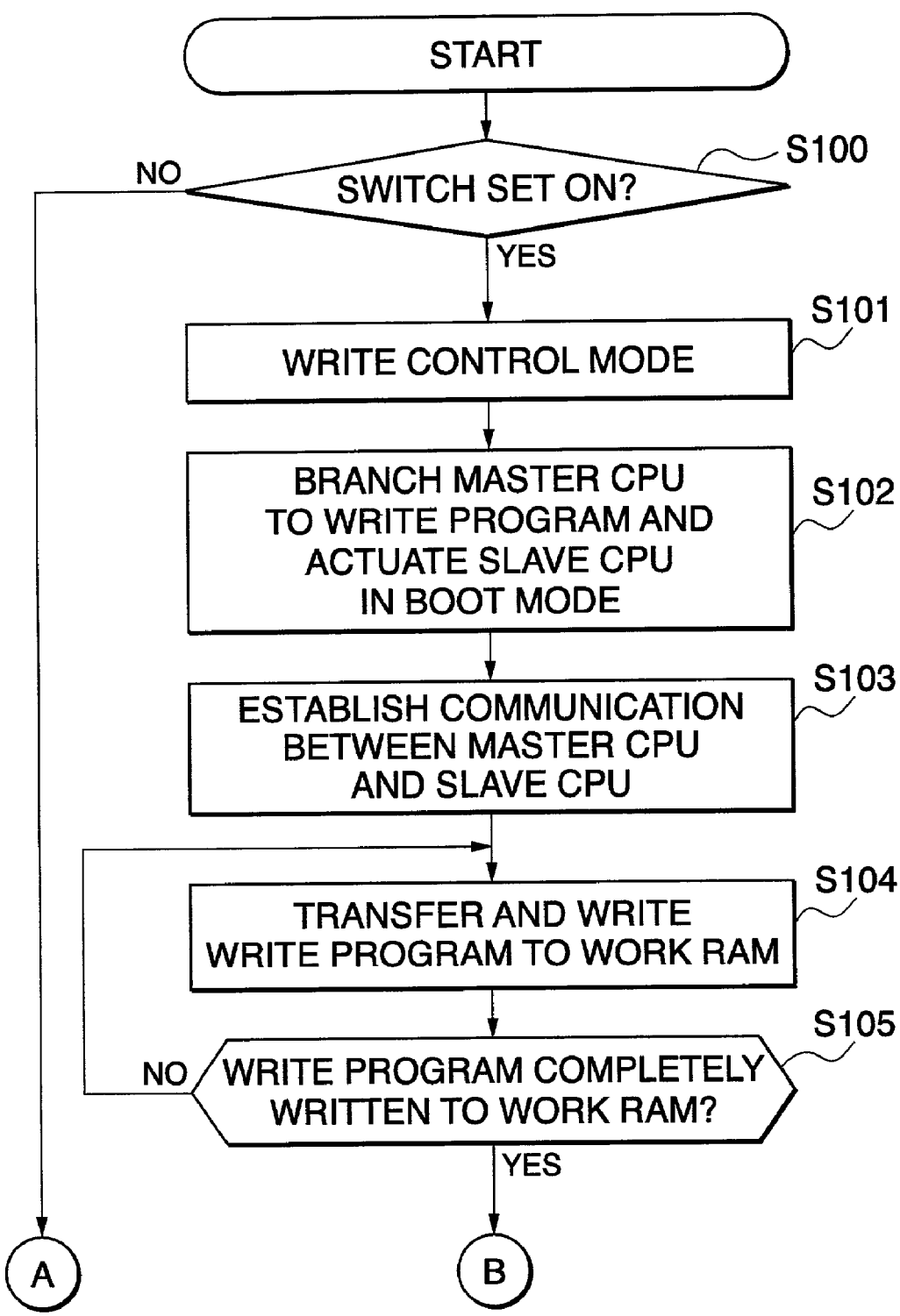
FIG. 6 is a flow chart showing a write control process according to an embodiment of the present invention.
Figure 7:
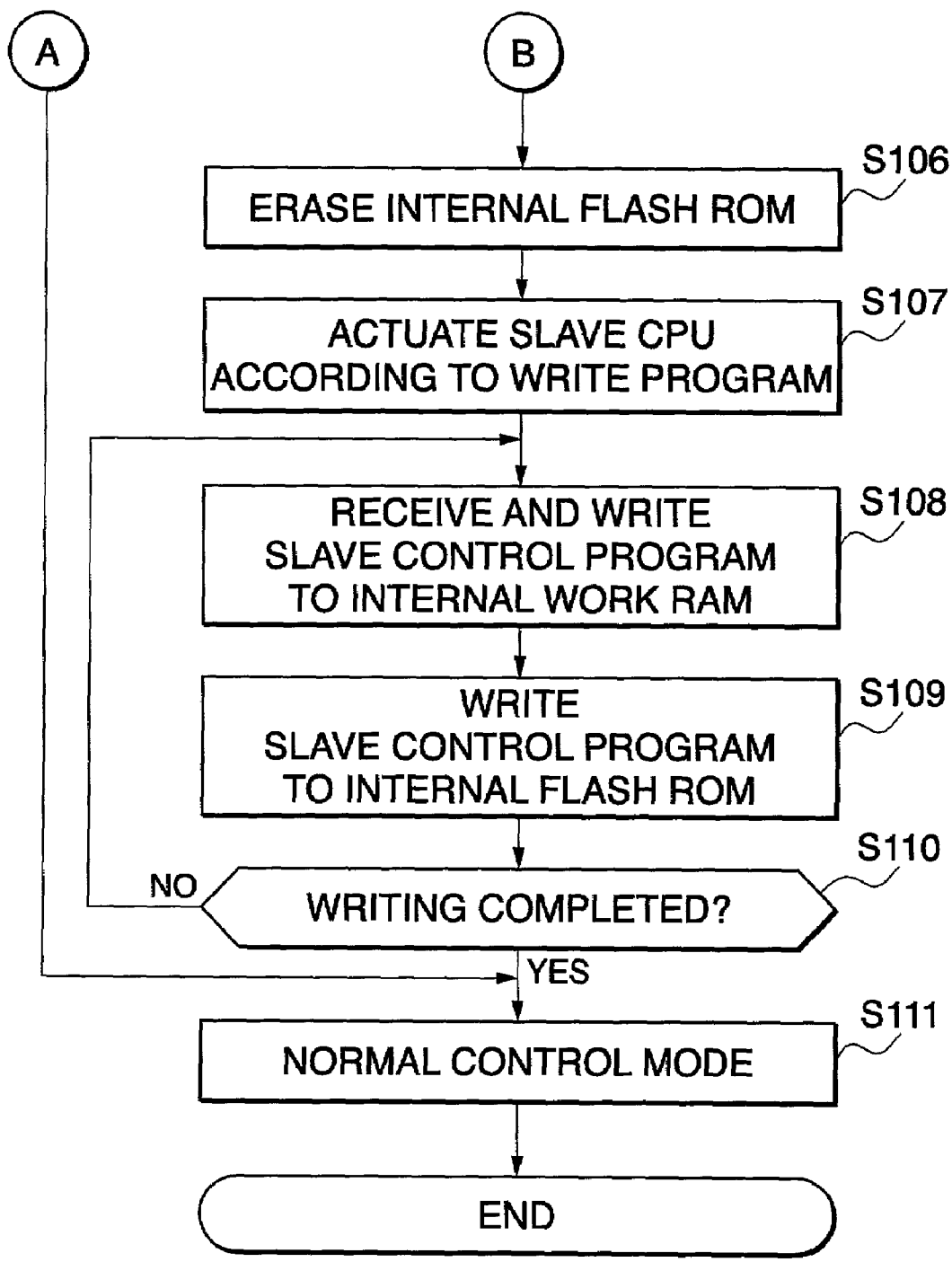
FIG. 7 is a flow chart showing a continued part of the write control process of FIG. 6.

FIGS. 6 and 7 are flow charts showing a write control process according to an embodiment of the present invention. Control for writing the second control program to the internal flash ROM 603 shown in these flow charts will be described on the assumption that the slave CPU 601 has a CPU operation mode in which the CPU 601 is dedicated to control of writing to the internal flash ROM 603.

First, in a step S100, the master CPU 501 determines, through execution of the control program therefor, whether the switch 505 installed in the finisher 2000 is set on or off, when the power supply to the image forming system is turned on. If the switch 505 is set off, the process proceeds to a step S111 (the normal control mode in which the apparatus performs normal operations). On the other hand, if the switch 505 is set on and the operator has directed the process of controlling writing of the control program to be executed, the process proceeds to a step 101 (the write control mode in which writing to the internal flash ROM 603 of the slave CPU 601 is controlled).

In the write control mode (step S101), in a step S102, the control of the master CPU 501 is branched to the write control program, and the slave CPU 601 is actuated in a boot mode dedicated to writing to the internal ROM 603. In a step S103, the slave CPU 601 actuated in the boot mode starts a boot program previously stored in a ROM for the slave CPU 601 to establish serial communication with the master CPU 501 using the serial I/F 702.

In a step S104, the master CPU 501 starts to transfer the write control program from the EPROM 503, to which this program has been written. Accordingly, the slave CPU 601 receives the write control program stored in the EPROM 503 of the master CPU 501, and then starts to write it to the work RAM 604. In a step S105, the process waits for the write control program to be completely written to the work RAM 604. Once the write control program is completely written to the work RAM 604, the process proceeds to a step S106.

In the step S106, the slave CPU 601 erases the data in the internal flash ROM 603. In a step S107, the slave CPU 601 branches its control from the boot program to the write control program. In a step S108, the slave CPU 601 then operating on the write control program communicates with the master CPU 601 to receive the control program for the slave CPU 601 from the EPROM 503 of the master CPU 501, and then writes this control program to the work RAM 604. Then, in a step S109, the slave CPU 601 operating on the write control program writes the control program for the slave CPU 601 stored in the work RAM 604, to the internal flash RAM 603.

In a step S110, the slave CPU 601 operating on the write control program checks whether or not the entire control program has been completely written to the internal flash ROM 603. Then, if the result of the check indicates that the entire control program has not been completely written to the internal flash ROM 603, the process returns to the step S108 to repeat the steps S108 to S110. If the entire control program has been completely written, the process exits from the write control mode, and the slave CPU 601 is actuated again through execution of the control program for the slave CPU 601 stored in the internal flash ROM 603. Then, the process proceeds to the normal control mode in the step S111 to complete the above described sequence of write process steps.

As described above, according to the present embodiment, the control program (first control program) for the master CPU 501, the control program (second control program) for the slave CPU 601, and the write control program are stored in the EPROM 503. As a result, when power is applied to the image forming system to actuate the system and if the write control mode has then been set, in which the second control program is written to the internal flash ROM 603, by transferring the write control program from the EPROM 503 of the master CPU 501 to the slave CPU 601, write control can be carried out to write the second control program stored in the EPROM 503 to the internal flash ROM 603.

To rewrite a control program, instead of using an external apparatus as in the prior art, according to the present invention, one of the plurality of CPUs (the master CPU 501 and slave CPU 601) which are provided to control the finisher 2000, that is, the master CPU 501 is used as a host CPU, while the control program for the slave CPU 601 and the write control program for executing writing to the internal flash ROM 603 of the slave CPU 601 (write target CPU) are stored in the EPROM 503 that inherently stores the control program for the master CPU 501.

After the slave CPU 601 (write target CPU) has been actuated in the in the boot mode dedicated to writing, the write control program therefor is transferred from the master CPU 501 (host CPU) to the work RAM 604 of the slave CPU 601 (write target CPU). Then, the slave CPU 601 (write target CPU) is operated in accordance with the write control program to transmit and receive data to and from the master CPU 501 (host CPU), thereby writing the control program for the slave CPU 601 (write target CPU) to the internal flash ROM 603.

[Other Embodiments]

In the above-described embodiment, rewriting of a control program is executed in the arrangement comprised of a single master CPU and a single slave CPU. However, the present invention is not limited to this, but may be applied to an arrangement in which a plurality of slave CPUs are provided for a single master CPU. In this case, the EPROM of the master CPU stores one or more control programs for controlling the plurality of slave CPUs and one or more write control programs for controlling writing of the control program(s).

Although in the above-described embodiment, a control program for a slave CPU of a finisher of an image forming system is rewritten, the present invention is not limited to this, but may also be applied to an image forming apparatus constituting an image forming system as described above. In this case, the master CPU controls the basic operation of the entire image forming apparatus, whereas the slave CPU controls the operations of functional units (operating unit, exposing unit, conveying unit, fixing unit, and others) of the image forming apparatus. One of the functional units may be a finisher optionally provided for the image forming apparatus.

Although in the above-described embodiment, a control program for a slave CPU of a finisher of an image forming system is rewritten, the present invention is not limited to this, but may also be applied to a case of rewriting a plurality of control programs for a plurality of CPUs provided in any of various apparatuses operating on respective programs, including the above described image forming system.

Furthermore, the present invention may be applied to a system comprised of a plurality of apparatuses or to an apparatus comprised of a single apparatus. It goes without saying that the object of the present invention may also be achieved by supplying a system or an apparatus with a storage medium or the like which stores a program code of software that realizes the functions of any of the above-described embodiments, and causing a computer (or CPU or MPU) of the system or apparatus to read out and execute the program code stored in the storage medium or the like.

In this case, the program code itself read out from the storage medium or the like realizes the functions of the embodiment, so that the storage medium or the like storing the program code constitutes the present invention. The storage medium or the like for supplying the program code may be selected, for example, from a floppy disk, hard disk, optical disk, magneto-optical disk, CD-ROM, CD-R, magnetic tape, non-volatile memory card, and ROM, or the program may be downloaded via a network.

It is to be understood that the functions of any of the embodiments described above can be realized not only by executing a program code read out by a computer, but also by causing an operating system (OS) that operates on the computer to execute a part or the whole of the actual operations according to instructions of the program code.

Furthermore, the program code read out from the storage medium or the like may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of any of the embodiments described above.

The present invention has been described in conjunction with preferred embodiments thereof. However, it is to be appreciated that the present invention is not limited to these embodiments but that various variations and changes may be made thereto without deviating from the scope of the appended claims.

What is claimed is:

1. A program operating apparatus comprising:
a first CPU;
a second CPU;
first storage means removable from the program operating apparatus;
second storage means; and
selecting means that selects a control mode of the apparatus,
wherein said first storage means stores a first control program for controlling operation of said first CPU, a second control program for controlling operation of said second CPU, and a write control program for causing said second CPU to write the second control program to said second storage means,
wherein said second storage means is capable of storing the second control program for causing said second CPU to operate, and
wherein said first CPU operates in any of a normal mode in which said first CPU operates the first control program and a write control mode in which the write control program for causing said second CPU to write the second control program stored in said first storage means to said second storage means is transferred to said second CPU, according to the selection by said selecting device.

2. A program operating apparatus according to claim 1, wherein said first CPU is operable when the write control mode, for transferring the write control program to said second CPU is selected by said selecting means, for transferring the write control program from said first storage means to said second CPU, and said second CPU executes the write control program transferred from said first storage means to thereby write the second control program stored in said first storage means to said second storage means.

3. A program operating apparatus according to claim 1, wherein said second storage means comprises a rewritable non-volatile storage medium.

4. A program operating apparatus according to claim 3, wherein said second storage means comprises a rewritable non-volatile storage medium provided in said second CPU.

5. A program operating apparatus according to claim 1, which is applicable to an image forming apparatus for forming images on sheets.

6. A program operating apparatus according to claim 5, wherein said image forming apparatus comprises a main body, and at least one functional unit, and wherein said first CPU controls basic operation of said main body of said image forming apparatus, and said second CPU controls operations of said at least one functional unit.

7. A program operating apparatus according to claim 1, which is applicable to a finisher for executing post-processing on sheets having images formed thereon.

8. A program operating apparatus according to claim 7, wherein said finisher comprises a main body, and at least one functional unit, and wherein said first CPU controls basic operation of said main body of said finisher, and said second CPU controls operations of said at least one functional unit.

9. A program write control apparatus according to claim 1, which is mounted in an image forming apparatus for forming images on sheets.

10. A program write control apparatus according to claim 9, wherein said image forming apparatus comprises a main body, and at least one functional unit, and wherein said first CPU controls basic operation of said main body of said image forming apparatus, and said second CPU controls operations of said at least one functional unit.

11. A program write control apparatus according to claim 1, which is mounted in a finisher for executing post-processing on sheets having images formed thereon.

12. A program write control apparatus according to claim 11, wherein said finisher comprises a main body, and at least one functional unit, and wherein said first CPU controls basic operation of said main body of said finisher, and said second CPU controls operations of said at least one functional unit.

13. A program write control apparatus comprising:
a first CPU;
a second CPU;
first storage means is removable from the program write control apparatus; and
second storage means storing the,
wherein said first storage means stores a first control program for controlling operation of said first CPU, a second control program for controlling operation of said second CPU, and a write control program for causing said second CPU to write the second control program to said second storage means,
wherein said second storage means is capable of storing the second control program for causing said second CPU to operate, and
wherein said first CPU operates the first control program stored in said removable first storage means in a normal mode, and said first CPU is operable when a mode of the apparatus is switched to a write control mode in which the second control program stored in said first storage means is written to said storage means, for transferring the write control program from said first storage means to said second CPU, and said second CPU executes the write control program transferred from said first storage means to thereby write the second control program stored in said first storage means to said second storage means.

14. A program write control apparatus according to claim 13, wherein said first CPU is operable when the mode of the apparatus is switched to the write control mode, for transferring the write control program for causing said second CPU to write the second control program to said second storage means to a storage area accessible by said second CPU, to execute.

15. A program write control apparatus according to claim 13, wherein said second storage means comprises a rewritable non-volatile storage medium.

16. A program write control apparatus according to claim 15, wherein said second storage means comprises a rewritable non-volatile storage medium provided in said second CPU.

17. A program write control apparatus according to claim 13, wherein said first CPU is operable when power is applied to the apparatus to actuate same, for transferring the write control program to said second CPU if the mode of the apparatus has been switched to the write control mode by switching means for switching between the normal control mode in which normal control of the apparatus is carried out and the write control mode.

18. A program write control method executed by a program operating apparatus comprising a first CPU that has operation thereof controlled by a first control program, a second CPU that has operation thereof controlled by a second control program, first storage means that is removable from the program operating apparatus, and stores the first control program, the second control program, and a write control program, and second storage means capable of storing the second control program, the method comprising the steps of:

controlling the operation of said first CPU by the first control program stored in said first storage means in a normal mode;

executing write control comprising transferring the write control program stored in said first storage means form said first storage means to said second CPU, and causing said second CPU to write the second control program stored in said first storage means to said second storage means when a mode of the apparatus is switched to a write control mode in which the second control program stored in said first storage means is written to said second storage means.

19. A program write control method according to claim 18, wherein said step of executing the write control comprises causing said first CPU to transfer the write control program for executing a process of writing the second control program to said second storage means to a storage area accessible by said second CPU means, when the mode of the apparatus is switched to the write control mode.

20. A program write control method according to claim 18, which is executed by an image forming apparatus for forming images on sheets.

21. A program write control method according to claim 20, wherein said image forming apparatus comprises a main body, and at least one functional unit, and wherein said first CPU controls basic operation of said main body of said image forming apparatus, and said second CPU controls operations of said at least one functional unit.

22. A program write control method according to claim 18, which is executed by a finisher for executing post-processing on sheets having images formed thereon.

23. A program write control method according to claim 22, wherein said finisher comprises a main body, and at least one functional unit, and wherein said first CPU controls basic operation of said main body of said finisher, and said second CPU controls operations of said at least one functional unit.

24. A program operating apparatus comprising:
at least one functional unit;
a first CPU;
a second CPU;
first storage means that is removable from the program operating apparatus; and
second storage means,
wherein said first storage means stores a first control program for controlling operation of said first CPU to thereby control basic operation of the entire apparatus, a second control program for controlling operation of said second CPU to thereby control operation of said functional unit, and a write control program for causing said second CPU to write the second control program to said second storage means,
wherein said second storage means is capable of storing the second control program for causing said second CPU to operate, and
wherein said first CPU operates the first control program stored in said first storage means in a normal mode, and said first CPU is operable when a mode of the apparatus is switched to a write control mode in which the second control program stored in said first storage means is written to said second storage means, for transferring the write control program stored in said first storage means to said second CPU, and said second CPU executes the write control program transferred from said first storage means to thereby write the second control program stored in said first storage means to said second storage means.

25. A program operating apparatus according to claim 24, which is applicable to an image forming apparatus for forming images on sheets.

26. A program operating apparatus according to claim 24, which is applicable to a finisher for executing post-processing on sheets having images formed thereon.

27. An image forming apparatus comprising:
at least one functional unit;
a first CPU;
a second CPU;
first storage means that is removable from the image forming apparatus; and
second storage means,
wherein said first storage means stores a first control program for controlling operation of said first CPU to thereby control basic operation of the entire apparatus, a second control program for controlling operation of said second CPU to thereby control operation of said functional unit, and a write control program for causing said second CPU to write the second control program to said second storage means,
wherein said second storage means is capable of storing the second control program for causing said second CPU to operate, and
wherein said first CPU operates the first control program stored in said first storage means in a normal mode, and said first CPU is operable when a mode of the apparatus is switched to a write control mode in which the second control program stored in said first storage means is written to said second storage means, for transferring the write control program stored in said first storage means from said first storage means to said second CPU, and said second CPU executes the write control program transferred from said first storage means to thereby write the second control program stored in said first storage means to said second storage means.

28. A finisher comprising:

at least one functional unit;

a first CPU;

a second CPU;

first storage means that is removable from the finisher; and second storage means, wherein said first storage means stores a first control program for controlling operation of said first CPU to thereby control basic operation of the entire finisher, a second control program for controlling operation of said second CPU to thereby control operation of said functional unit, and a write control program for causing said second CPU to write the second control program to said second storage means, wherein said second storage means is capable of storing the second control program for causing said second CPU to operate, and wherein said first CPU operates the first control program stored in said first storage means in a normal mode, and said first CPU is operable when a mode of the finisher is switched to a write control mode in which the second control program stored in said first storage means is written to said second storage means, for transferring the write control program stored in said first storage means from said first storage means to said second CPU, and said second CPU executes the write control program transferred from said first storage means to thereby write the second control program stored in said first storage means to said second storage means.

* * * * *